United States Patent [19]

Busto

[11] 4,240,644
[45] Dec. 23, 1980

[54] PISTON SEAL

[75] Inventor: Jerry T. Busto, Lakewood, Colo.

[73] Assignee: Gemini Seals, Inc., Lakewood, Colo.

[21] Appl. No.: 791,540

[22] Filed: Apr. 27, 1977

[51] Int. Cl.³ .............................................. F16J 9/02
[52] U.S. Cl. ................................... 277/194; 277/197; 92/182
[58] Field of Search ................. 92/182, 246; 277/272, 277/188 R, 136, 194, 197

[56] References Cited

U.S. PATENT DOCUMENTS

| | | | |
|---|---|---|---|
| 2,836,252 | 5/1958 | Lane | 277/188 R |
| 2,900,213 | 8/1959 | Bruce | 277/197 |
| 3,806,134 | 4/1974 | Schexnader | 277/212 |
| 3,991,455 | 11/1976 | Bergeron | 277/197 |
| 4,121,838 | 10/1978 | Sakamaki | 277/194 |

Primary Examiner—Robert I. Smith

Attorney, Agent, or Firm—Kyle W. Rost

[57] ABSTRACT

A piston seal having two spring tensioned rings which are biased radially toward the cylinder wall and seated in the uppermost one of the ring groove in the piston head. The upper ring has a relatively small and constant thickness of between 0.005 and 0.030 inches and includes a radially extending base seated in the ring groove and an axially extending flange forming an obtuse angle of between 98 and 101 degrees with the base and extending outwardly of the piston head such that fluid under pressure in the cylinder flexes the flange into sealing contact with the cylinder wall. The lower ring functions as a standard compression ring and also supports the thin upper flex ring. The upper flex ring has a predetermined size opening in the base which is aligned with the gap in the compression support ring to provide a controlled "blow-by" to minimize oil reservoiring below the rings caused by the more effective seal.

26 Claims, 4 Drawing Figures

PISTON SEAL

BACKGROUND OF THE INVENTION

The present invention relates to seals and more particularly to seals for reciprocating pistons which provides increased power output of the unit, for example, an internal combustion engine.

The rapid piston reciprocation in internal combustion engines often causes the typical compression ring to move radially out of sealing contact with the cylinder bore causing a loss of seal around the piston. Compressed gas then escapes around the ring resulting in a loss of power. This condition is well recognized in the art as "blow-by." Blow-by also occurs through the gap in the typical ring.

The prior art offers numerous solutions to the blow-by problem. One general solution is the so called L-shaped compression ring. Such rings are taught by U.S. Pat. Nos. 2,844,422 and 2,844,424. The L-shaped rings of these patents provides a relatively large radially extending base ring portion seated in ring grooves in the piston head and a longer axially extending ring portion which is moved into sealing engagement with the cylinder bore by compressed gas in the cylinder.

These rings have several disadvantages, most notable of which are that the relatively thick base portions will not provide the necessary flexibility of the axially extending flange to maintain good sealing contact with the cylinder bore. Power loss is also experienced in blow-by through the gap in the rings. Ring wear increases the size of the gap which increases the amount of blow-by. The Blow-by through the gap of the typical ring is necessary to drive the oil toward the pan and thereby preventing oil from accumulating or reservoiring below the ring.

The overall weight necessary for long life of these prior art designs subjects them to bouncing off the cylinder wall at high revolution per minute, i.e., above 3,000 causing loss of seal. Also the designs require more complex manufacturing with increased costs of the rings.

Applicant is further aware of an L-shaped piston ring that is manufcatured by Seal Power Corporation having a place of business at Muskegon, Mich., and marketed under the trademark "Head Land Ring." This ring has a radially extending base that seats in a ring groove and a slightly thinner flange which extends axially at approximately 90° to the base. The flange thickness of one such ring is 0.050 inches and the base thickness is 0.063 inches and weighs approximately 17 grams. This ring suffers from the same disadvantages of the above cited patents, and in addition, the right angle flange orientation presents less area against which the gas under pressure can act to drive the flange into contact with the cylinder wall and the entire face of the flange contacts the cylinder wall requiring that it be machined.

Applicant's seal overcomes these disadvantages of the prior art by providing a two ring seal which seats in a common ring groove in the piston head. The two ring seal permits the upper ring to be very thin and, hence, very flexible for ease of flexing into good sealing relationship with the cylinder wall. This flexing is enhanced by the flange extending at an obtuse angle to the ring body portion thereby presenting greater area for the gas pressure to work against.

The reduced thickness of Applicant's upper ring provides less mass and less tendency to bounce off the cylinder wall and breaking the seal.

The other ring functions as a typical compression seal while supporting the thinner upper ring. The two rings are oriented with their gaps diametrically opposed to prevent blow-by through the aligned gap. As a result, a controlled "blow-by" is provided through an opening in one ring which communicates with a gap in the lower ring to prevent oil reservoiring beneath the rings.

The seal according to the present invention provides a very effective dual ring seal that minimizes oil reservoiring beneath the very effective seal, is relative inexpensive to manufacture due to the simplified design approach embodied therein.

These and other objects will become apparent in the detailed description of the preferred embodiment of the piston seal according to the present invention.

PREFERRED EMBODIMENT

The preferred embodiment of the piston seal according to the invention will be described in relation to the drawings and in which.

Figure 1:
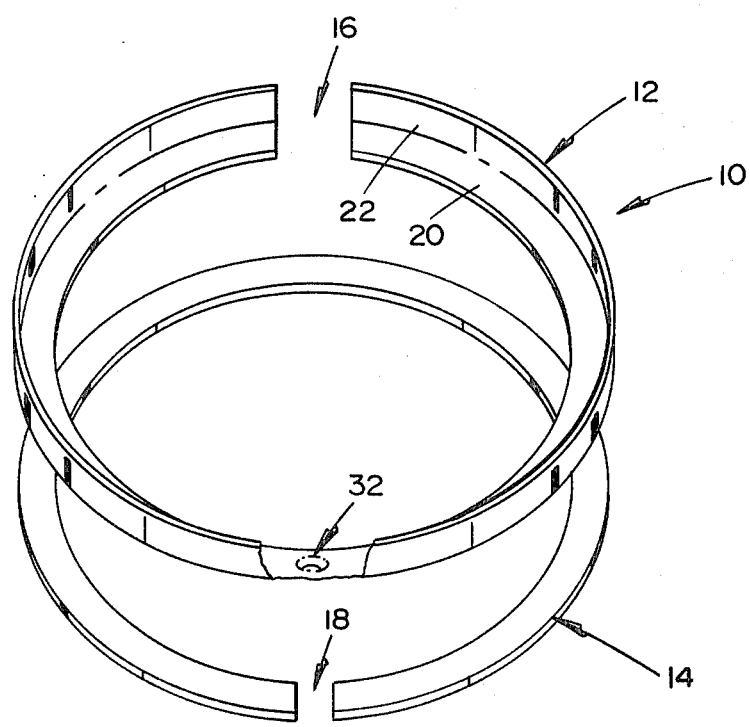
FIG. 1, is a perspective view of the dual ring piston seal according to the present invention.

FIG. 1, discloses a dual ring piston seal 10 comprising rings 12 and 14. Ring 12 and 14 are, in the preferred embodiment metal split rings having typical gaps 16 and 18 for seating in a piston ring groove.

Rings 12 and 14 are illustrated in FIG. 1 in their disposition relative to one another except that when installed in a piston they are in contãct. Upper ring 12 is relatively thin, lightweight, highly flexible and preferably made of annealed stainless steel. Ring 12 includes a radially extending body portion 20 which seats in a ring groove of a piston and an integral flange portion 22 that extends axially at an obtuse angle to body or seat portion 20.

The flexible, lightweight ring 12 is supported during operation by the stronger compression piston ring 14. Support ring 14 is preferably of rectangular cross-section adapted to seat in the ring groove of the piston and is biased radially by spring tension to contact the cylinder wall in the conventional manner. Hence, rings 12 and 14 both function as sealing rings providing a dual sealing capability.

Figure 2:
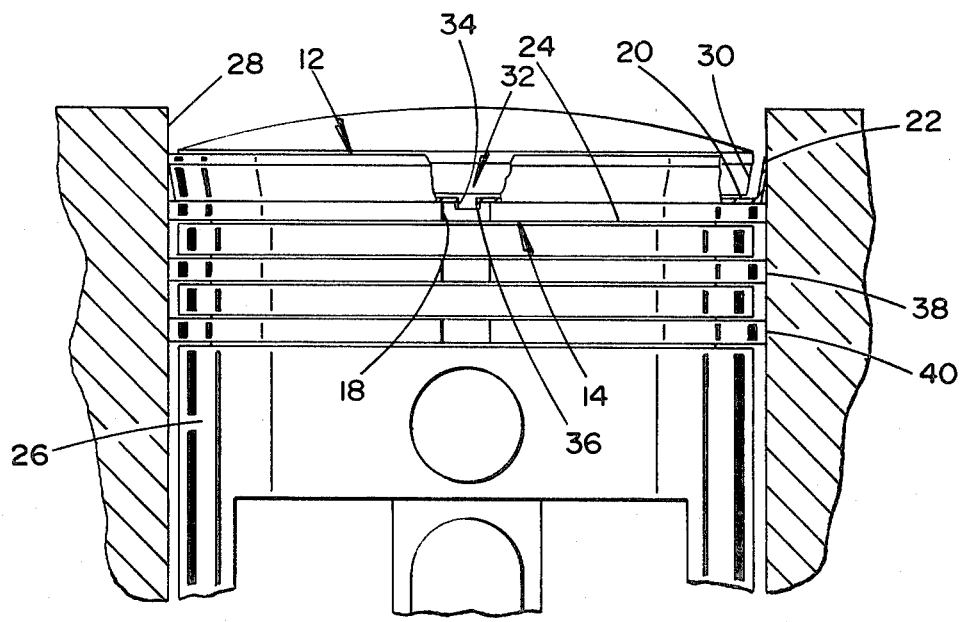
FIG. 2, is a partial sectional view showing a piston and cylinder with the piston seal of FIG. 1 in operating position.
Figure 3:
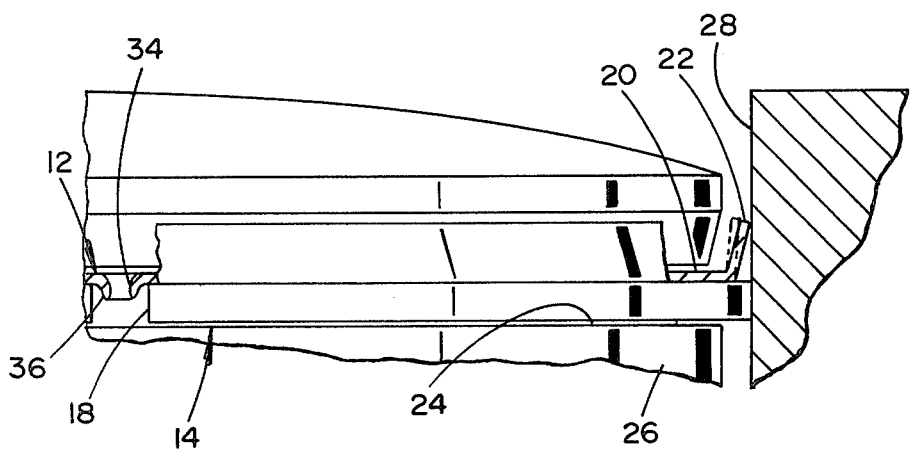
FIG. 3, is an enlarged portion of FIG. 2 illustrating flexing of the flange of the upper seal.
Figure 4:
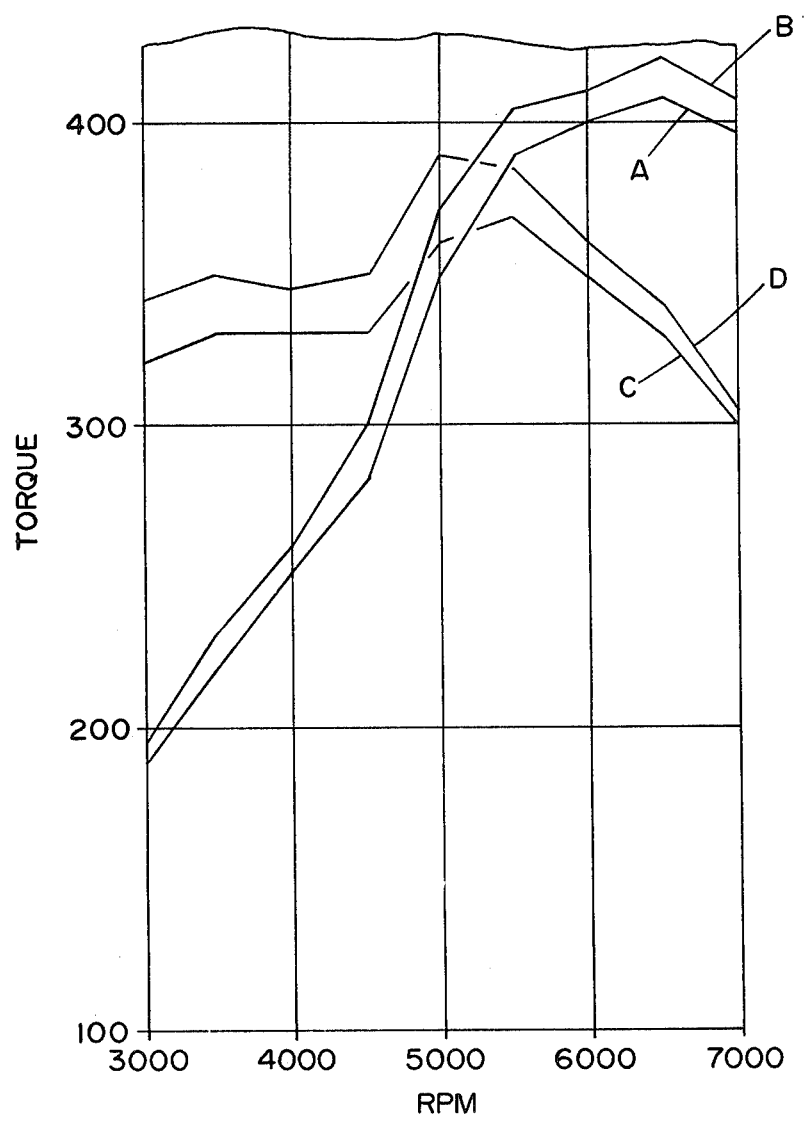
FIG. 4, is a graphic representation of test results of operation of an internal combustion engine with and without the piston and seal according to the present invention.

Ring 12 and 14 are assembled or seated in the uppermost piston ring groove 24 as shown in FIG. 2. Ring 12 is supported on ring 14 and flange 22 protrudes beyond the periphery of piston 26 and is biased by spring tension into contact with cylinder wall 28 as shown in FIGS. 2 and 3. The surface 30 of piston 26 immediately above ring groove 24 is bevelled to provide greater access of the upper surface of flange 22 to the compressed gas above piston 26.

Fluid under pressure above piston 26 acting on the upper surface of flange 22 flexes the flange into tight contact effecting a sealing engagement with cylinder wall 28. Normally the spring tension of ring 12 maintains the upper portion of flange 22 in contact with cylinder 28 as illustrated in FIG. 2. However, for purposes of understanding, the dotted line representation of flange 22 in FIG. 3 shows the flange 22 out of contact with cylinder wall 28 although this is not the normal situation. This flexing of flange 22 is provided by making ring 12 of relatively thin and resilient material. It has been found that ring 12 can be made of annealed stainless steel such as stainless steel Numbers 304,321, and 21-69. The thickness T of ring 12 varies depending of the type of use to which the seal is applied. For example, in supercharged internal combustion engines, T may be between 0.015 and 0.030 inches; in non-super charged engines T may be between 0.005 and 0.015 inches; and in two cycle motorcycle engines T may be between 0.015 and 0.020 inches and in four cycle motorcycle engines T may be between 0.005 and 0.015 inches. These exemplary ranges are practical ranges considering many factors and have not been established as critical to the operation of the seal.

It should be apparent that after operation, the edge of flange 22 in contact with cylinder wall 28 will wear to a razor edge providing a line sealing engagement with wall 28. This line contact minimizes friction produced by the ring/wall contact while providing an effective seal against "blow-by."

In addition, the lightweight of ring 12 provides a ring of low mass thereby minimizing the tendency of the ring to bounce off wall 28 and if it does bounce, the seal will be quickly re-established. Some representative weights of rings 12 are 4.0 grams where T is 0.010 inches and 8.0 grams where T is 0.020 inches.

The combination of the use of thin flexible material resulting in a relatively lightweight ring provides a very effective seal with reasonable life. The use of the thin, flexible and lightweight seal is possible by providing the contiguously supporting ring 14. The thickness of ring 14 is not of great significance provided it has a minimum thickness of 0.043 inches which is necessary to provide for proper support of ring 12 and to perform its usual sealing function by engaging wall 28 as illustrated. Any commercially available ring can be used as support ring 14 provided it is of the minimum thickness set forth above. Ring 14 may for example, be made of cast iron or stainless steel.

Rings 12 and 14 have cooperating means 32 to provide a controlled leak or "blow-by" to drive the oil which tends to reservoir beneath ring 14 downward toward the oil pan. Reservoiring is caused where a tight seal is maintained between a piston and cylinder wall such as the present invention provides. If ignored, the reservoired oil will eventually migrate through a hydraulic effect around the seal into the combustion chamber above the piston causing oil to be rapidly consumed by burning and collecting on the spark plug rendering the plug inoperative.

Cooperating means 32 minimizes oil reservoiring by providing an opening 34 in body which registers with gap 18 of ring 14 and provides for flow of gas through seal 10 which causes any accumulated oil to be flushed downward toward the crank case. When rings 12 and 14 are seated in ring groove 24, gaps 16 and 18 are oriented 180° apart as shown in FIG. 1.

This gap orientation is maintained and opening 24 disposed in register or communication with gap 18 by the depending metal 36 provided by punching hole 34 in ring 12. Depending metal or lug 36 prevents unrestricted relative rotation of rings 12 and 14 by engaging either end of ring 14 defining gap 18. Although not critical, opening 34 should be of a diameter between 0.020 and 0.040 inches and preferably 0.030 inches. This range of diameters permits sufficient gas to flow through seal 10 to minimize oil reservoiring while maintaining the controlled "blow-by" to a minimum.

Blow-by is prevented from occurring around the inner ends of the rings 12 and 14 through ring groove 24 by gas pressure forcing rings 12 and 14 into tight sealing relationship with the lower face of ring groove 24. Hence the only gas leak or "blow-by" is through opening 32 and gap 18 which is held within acceptable limits by controlling the diameter of opening 32.

The piston seal 10 provides a very effective seal through the operation of rings 12 and 14 as previously described which minimizes the oil reservoiring problem associated with effective seals. Test conducted on piston seals according to the present invention have substantiated the effectiveness of the seal. A racing engine was tested with standard compression rings and with rings similar to rings 12 and 14. FIG. 5 presents the results of such tests plotting horsepower vs. revolutions per minute of the engine. The engine horsepower generated without the piston seal in accordance to the present invention is shown as A and the horsepower generated by the same engine using the piston seal in accordance with the present invention is shown as B in FIG. 5. The corresponding horsepower was calculated from the torque readings and plots C and D were made representing torque without and with piston seals, respectively according to the present invention. The results of the test indicates an average increase of 15 ft.-lbs. of torque using piston seals according to the present invention.

Other than providing bevel 30 in piston 26, no additional modifications are required of the piston or cylinder to utilize piston seals 10 to achieve the considerable increased engine performance. The typical standard oil scraper ring 38 and standard oil ring 40 complete the piston and ring assembly. These rings perform their usual function and further explanation is not deemed necessary.

Piston seal 10 although described in the preferred embodiment in an internal combustion engine, have application for sealing virtually any reciprocating piston operated by fluid under pressure gas or liquid as for example, in a pump.

What is claimed is:

1. A piston seal for use in sealing a piston reciprocating in a cylinder of an internal combustion engine comprising cooperating first and second sealing rings adapted to seat in a common piston ring groove in stacked relationship with one another, said first ring having a thickness substantially less than said second ring and approximately between 0.005 and 0.030 inches, having a radial spring tension biasing it radially toward contact with a cylinder bore and having a radially extending portion seatable in a ring groove and an axially extending flange portion forming the outer periphery of said first ring such that it is exposed, when operating, to fluid under pressure in a cylinder which forces said axial portion radially into sealing engagement with a cylinder bore and said second ring having radial spring tension biasing it radially toward contact with a cylinder bore, and said second ring having a relatively greater thickness than said first ring and having a rectangular cross-section and disposed beneath said first ring to thereby support said first ring during operation.

2. The piston seal as defined in claim 1, wherein said axial portion of said first ring extends at an angle of between 98 to 101 degrees to said radially extending portion.

3. The piston seal as defined in claim 1, further including means providing a controlled leak path for fluid through said first and second rings to control oil accumulation beneath said second ring.

4. The piston seal as defined in claim 3, wherein said second ring and means further includes a gap in said second ring and a predetermined sized opening in said first ring in communication with said gap.

5. The piston seal as defined in claim 4, further including means interconnecting said first and second rings to minimize relative rotation therebetween to maintain said opening in communication with said gap.

6. A piston seal as defined in claim 5, wherein said interconnecting means includes material depending from said first ring formed by punching said opening and registerable with the ends of said second ring defining said gap.

7. A piston seal as defined in claim 4, wherein said opening has a diameter between 0.020 and 0.040 inches.

8. A piston seal as defined in claim 1, wherein said first ring has a relatively constant thickness.

9. A piston seal as defined in claim 1, wherein said second ring has a minimum relatively constant thickness of 0.043 inches.

10. A piston seal as defined in claim 1, wherein said first ring is made of annealed stainless steel.

11. An improved piston seal for operating in a cylinder of an internal combustion engine of the type employing a reciprocable piston having a head with a plurality of ring grooves disposed circumferentially about the head and carrying first and second sealing rings seated in the uppermost one of said ring grooves, wherein the improvement comprises said first sealing ring having a relatively constant thickness of between 0.005 and 0.030 inches, having a radially extending portion seated in said ring groove and an axially extending flange portion forming the periphery of said ring and extending outwardly of said head such that it is exposed to fluid pressure in the cylinder, causing the flange of the first ring to radially flex relative to said radially extending portion into contact with the cylinder wall; and said second ring having a relatively greater thickness than the first ring and disposed beneath the first ring to support the first ring.

12. A piston seal as defined in claim 11, wherein said piston head is bevelled immediately above said one ring groove to thereby provide greater exposure of said flange portion to fluid under pressure.

13. The piston seal as defined in claim 11, wherein said axial portion of said first ring extends at an angle of between 98 to 101 degrees to said radially extending portion.

14. The piston seal as defined in claim 11, further including means providing a controlled leak path for fluid through said first and second rings to control oil accumulation beneath said second ring.

15. The piston seal as defined in claim 14, wherein said second ring and means further includes a gap in said second ring and a predetermined sized opening in said first ring in communication with said gap.

16. The piston seal as defined in claim 15, further including means interconnecting said first and second rings to minimize relative rotation therebetween to maintain said opening in communication with said gap.

17. A piston seal as defined in claim 15, wherein said opening has a diameter between 0.020 and 0.040 inches.

18. A piston seal as defined in claim 11, wherein said first ring is made of annealed stainless steel and weighs between 4.0 grams and 8.0 grams depending on said thickness.

19. A piston seal for sealing a piston reciprocating in a cylinder in response to fluid under pressure comprising a ring having a radially extending portion seatable in a ring groove of a piston and an axially extending flange portion integral with said radially extending portion and extending at an obtuse angle relative to said radially extending portion, exposing said axially extending flange portion to fluid under pressure during operation to flex said flange portion relative to said radial portion into sealing contact with a wall of a cylinder, said radially extending portion and said axially extending portion being of relatively constant thickness substantially between 0.005 and 0.030 inches to permit flexing of said flange portion relative to said radially extending portion.

20. A piston seal as defined in claim 19, wherein said obtuse angle is between 98 and 101 degrees.

21. A piston seal as defined in claim 19, wherein said radially extending portion includes a predetermined size opening to provide a flow path therethrough for fluid.

22. A piston seal as defined in claim 21, wherein said opening having a diameter between 0.020 and 0.040 inches.

23. A piston seal as defined in claim 22, wherein said ring is made of annealed stainless steel.

24. A piston seal as defined in claim 19, further including a compression ring adapted to seat in the same piston ring groove and beneath said ring, and is biased radially by spring tension.

25. A piston seal as defined in claim 24, further including means providing a fluid passage through said ring and compression ring.

26. A piston seal as defined in claim 24, further including a piston having a piston head, said piston head including a ring groove in which said compression ring and ring is seated and further including a bevelled surface above said ring groove to expose said flange portion to fluid under pressure.

* * * * *